US008195824B2

(12) United States Patent
Park et al.

(10) Patent No.: US 8,195,824 B2
(45) Date of Patent: Jun. 5, 2012

(54) USER SERVICE PROFILE-BASED PLUG-IN UPDATE METHOD AND APPARATUS FOR INTERNET PROTOCOL TELEVISION SERVICE

(75) Inventors: Ho-Yeon Park, Seoul (KR); Ji-Finn Keum, Suwon-si (KR); Jun-Hyung Kim, Suwon-si (KR); Sung-Oh Hwang, Yongin-si (KR); Bo-Sun Jung, Sungnam-si (KR)

(73) Assignee: Samsung Electronics Co., Ltd (KR)

( * ) Notice: Subject to any disclaimer, the term of this patent is extended or adjusted under 35 U.S.C. 154(b) by 146 days.

(21) Appl. No.: 12/607,669

(22) Filed: Oct. 28, 2009

(65) Prior Publication Data

US 2011/0099283 A1    Apr. 28, 2011

(51) Int. Cl.
*G06F 15/16* (2006.01)
*G06F 15/177* (2006.01)
*G06F 15/173* (2006.01)
*G06F 9/46* (2006.01)
*G06F 3/048* (2006.01)
*H04N 7/173* (2011.01)

(52) U.S. Cl. ........ 709/230; 709/221; 709/226; 725/110; 718/102; 715/772

(58) Field of Classification Search .................. 709/230, 709/226, 221
See application file for complete search history.

(56) References Cited

U.S. PATENT DOCUMENTS

| 2006/0117105 A1* | 6/2006 | Lesenne et al. ............... 709/226 |
| 2009/0070442 A1* | 3/2009 | Kacin et al. .................... 709/221 |
| 2009/0254912 A1* | 10/2009 | Roundtree et al. ............. 718/102 |
| 2010/0306689 A1* | 12/2010 | Jarvenpaa et al. ............. 715/772 |
| 2011/0035780 A1* | 2/2011 | Cedervall et al. ............. 725/110 |

* cited by examiner

*Primary Examiner* — Phuoc Nguyen
*Assistant Examiner* — Kishin G Belani
(74) *Attorney, Agent, or Firm* — The Farrell Law Firm, P.C.

(57) ABSTRACT

A method and system for updating a plug-in in a device in Internet Protocol TeleVision (IPTV) system are provided. The method includes determining a second plug-in group selected from among a first plug-in group to be updated according to status information of each plug-in indicated in the first plug-in group in the device; and updating each plug-in indicated in the determined second plug-in group.

24 Claims, 8 Drawing Sheets

FIG. 8

- Plug-in
  - Application/oipfPluginManager
- API
  - Plugin class
    - Properties
      - readonly String mimeType
      - readonly String name
      - readonly String version
      - readonly String status (0:new version, 1: update needed, 2: not installed)
  - Plugin Collection Class
    - Properties
      - readonly Integer length
    - Methods
      - Plugin Item (Integer Index)
  - PluginManager Class
    - Methods
      - PluginCollection checkAllPluginStatus(String userServiceProfileInfo)
        ➔ PARAMETER X: CHECK STATUSES OF ALL PLUG-INS WITHIN THE OITF DEVICE.
        ➔ PARAMETER O: RETURNS INFORMATION ON THE PLUG-INS ASSOCIATED WITH THE USER SERVICE PROFILE.
      - Plugin checkPluginStatus (String mimeType)
        ➔ CHECK STATUS OF PLUG-IN CORRESPONDING TO MIMETYPE INDICATED BY THE PARAMETER.
      - Boolean updatePlugin (Plugin plugin) / updatePluginList (Plugin plugin)
        ➔ UPDATE/INSTALL SELECTED PLUG-IN OR PLUG-INS.
        ➔ return (true: Successful, false: Failed)

USER SERVICE PROFILE-BASED PLUG-IN UPDATE METHOD AND APPARATUS FOR INTERNET PROTOCOL TELEVISION SERVICE

BACKGROUND OF THE INVENTION

1. Field of the Invention

The present invention relates generally to a method and system for updating plug-ins in an Internet Protocol TeleVision (IPTV) device, and in particular, to a system and method for updating plug-ins in an IPTV device according to a user service profile.

2. Description of the Related Art

Internet Protocol TeleVision (IPTV) refers to a system for delivering digital TV services either wired or wirelessly over an Internet Protocol (IP) network, in contrast to traditional over-the-air radio broadcast TV. With increased usage of broadband Internet services and a convergence of communication and broadcast services, IPTV is becoming a prominent market force, and is expected to impact the development of electronic appliances as well as broadcast and communication services.

The Open IPTV Forum (OIPF) is an industry organization formed to create standardized IPTV specifications for providing users with provider-independent IPTV services.

More specifically, the OIPF is developing interfaces and hardware platforms that will allow users to receive IPTV services from various IPTV service providers. Currently, in order to receive IPTV services from the various service providers, a user may be required to use multiple set-top boxes. The OIPF proposes providing these multiple IPTV services by defining a single functional block located in a residential network that would allow a user to receive IPTV services from various service providers without requiring multiple set-top boxes, thereby providing users with an increased selection of IPTV programs and services.

A conventional system and method for updating plug-ins in an IPTV device are described as follows with reference to FIGS. 1 and 2. FIGS. 1 and 2 are described in reference to an Open IPTV Terminal Function (OITF) device as an example, but similar methods may also be applied to other conventional IPTV systems and devices.

FIG. 1 is a diagram illustrating a conventional system for updating a plug-in according to an Open Internet Profile (OIP) model.

Referring to FIG. 1, the conventional system includes an OITF device 100, such as a set-top box or a TV set, which is operated by a user to access IPTV services. The OITF device 100 includes an application module such as a Declarative Application Environment (DAE) entity 101, which is a browser for providing a user interface and receiving user input. The DAE entity 101 also interacts with server-side IPTV applications server 110, which may be included in a remote HyperText Transfer Protocol (HTTP) server (not shown). The OITF device 100 further includes a Remote Management Plug-in object 103 and a "triggerSoftwareUpdate[ ]" Application Programming Interface (API) 105, which is used for updating plug-ins in the OITF device 100.

The conventional system further includes a software update server 130 that includes a software module 131. The Remote Management Plug-in object 103 retrieves updated software modules 131 by communicating with the software update server 130.

FIG. 2 is a sequence diagram illustrating signaling operations between devices during a conventional software update method in an OIP model.

Referring to FIG. 2, the DAE sends a "request update page" message to the IPTV applications server 110 in step S201. The DAE entity 101 may send the request update page in response to a user inputting a request for an update page to the DAE entity 101. Upon receiving the "request update page" message, the IPTV applications server 110 sends a "response update page" message including the update page to the DAE entity 101 in step S203. Upon receiving the "response update page" message, the DAE entity 101 displays the update page, which includes a clickable update button that may be selected by the user to initiate a software update of a specific update module. When the DAE entity 101 receives input of the user clicking the software update button in step S205, the DAE entity 101 initiates the "triggerSoftwareUpdate[ ]" API method 105 through the Remote Management plug-in object 103. Once the DAE entity 101 initiates the triggerSoftwareUpdate API method 105, the Remote Management plug-in object 103 accesses the update server 130, which stores the specific SoftWare (S/W) update module 131, and downloads and installs the specific software update module 131 in step S207.

The conventional IPTV software update method has several limitations. The conventional OITF device 100 does not selectively download update modules. More specifically, the conventional OITF device 100 does not provide support for specifically downloading user-specific, service provider-specific and device specific (i.e., Consumer Electronics (CE) device specific) downloads. The DAE entity 101 is limited to initiating a generic software update command without parameters for indicating specific modules to be updated. Therefore, according to the conventional system and method, a user is unable to selectively update plug-ins according to a user's indicated preferences.

SUMMARY OF THE INVENTION

As described above, in the prior art, an IPTV device requests a software update without parameters for selectively updating plug-ins according to a user's indicated preferences.

An object of the present invention is to substantially solve at least the above problems and/or disadvantages and to provide at least the advantages below. Accordingly, an object of the present invention is to provide a method of updating a plug-in in an IPTV device including a plug-in update module and an application module.

Another object of the present invention is to provide a system for updating a plug-in in an IPTV device.

According to one aspect of the present invention, there is provided a method of updating a plug-in in an IPTV device including a plug-in update module and an application module. The method includes determining a second plug-in group selected from among a first plug-in group to be updated according to status information of each plug-in indicated in the first plug-in group in the IPTV device; and updating each plug-indicated in the second plug-in group.

According to yet another aspect of the present invention, there is provided a device for updating a plug-in in an IPTV system. The device includes an application module for determining a second plug-in group selected from among a first plug-in group to be updated according to status information of each plug-in indicated in the first plug-in group in the device; and a plug-in update module for updating the each plug-in indicated in the second plug-in group.

According to yet another aspect of the present invention, there is provided a system for updating a plug-in in an IPTV device. The system includes an application module for determining a second plug-in group selected from among a first plug-in group to be updated according to status information of each plug-in indicated in the first plug-in group in the IPTV device; and a plug-in update module for updating the each plug-in indicated in the determined second plug-in group.

BRIEF DESCRIPTION OF THE DRAWINGS

The above and other objects, features and advantages of the present invention will become more apparent from the following detailed description when taken in conjunction with the accompanying drawings in which:

FIG. 8 is a diagram illustrating a format of a plug-in for use in the user profile-base plug-in update method according to an embodiment of the present invention.

DETAILED DESCRIPTION OF EMBODIMENTS OF THE INVENTION

Figure 1:
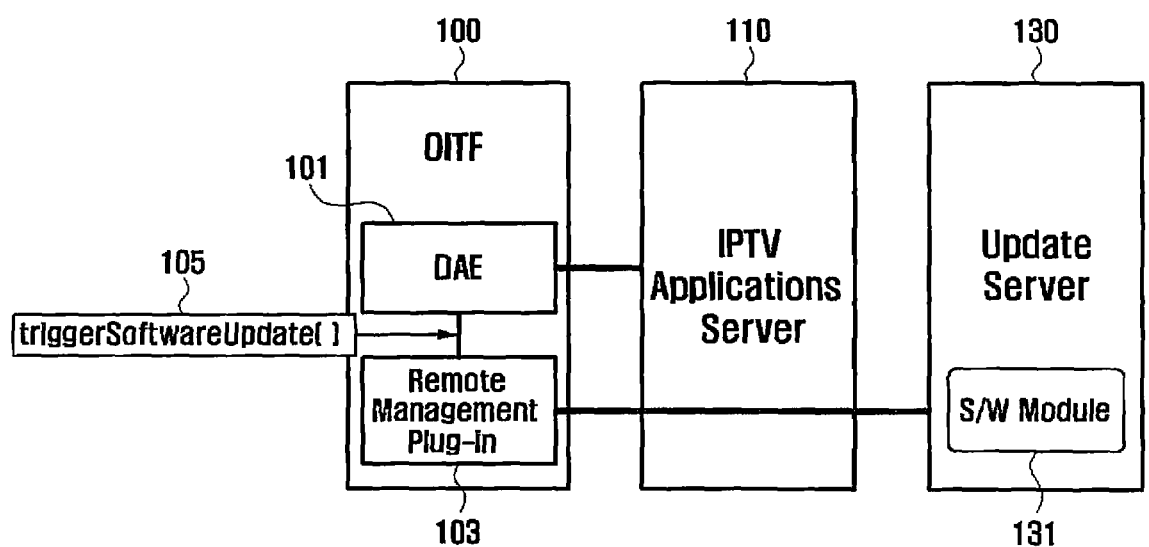
FIG. 1 is a diagram illustrating a system for a plug-in update method in a conventional Open Internet Profile model (OIP)
Figure 2:
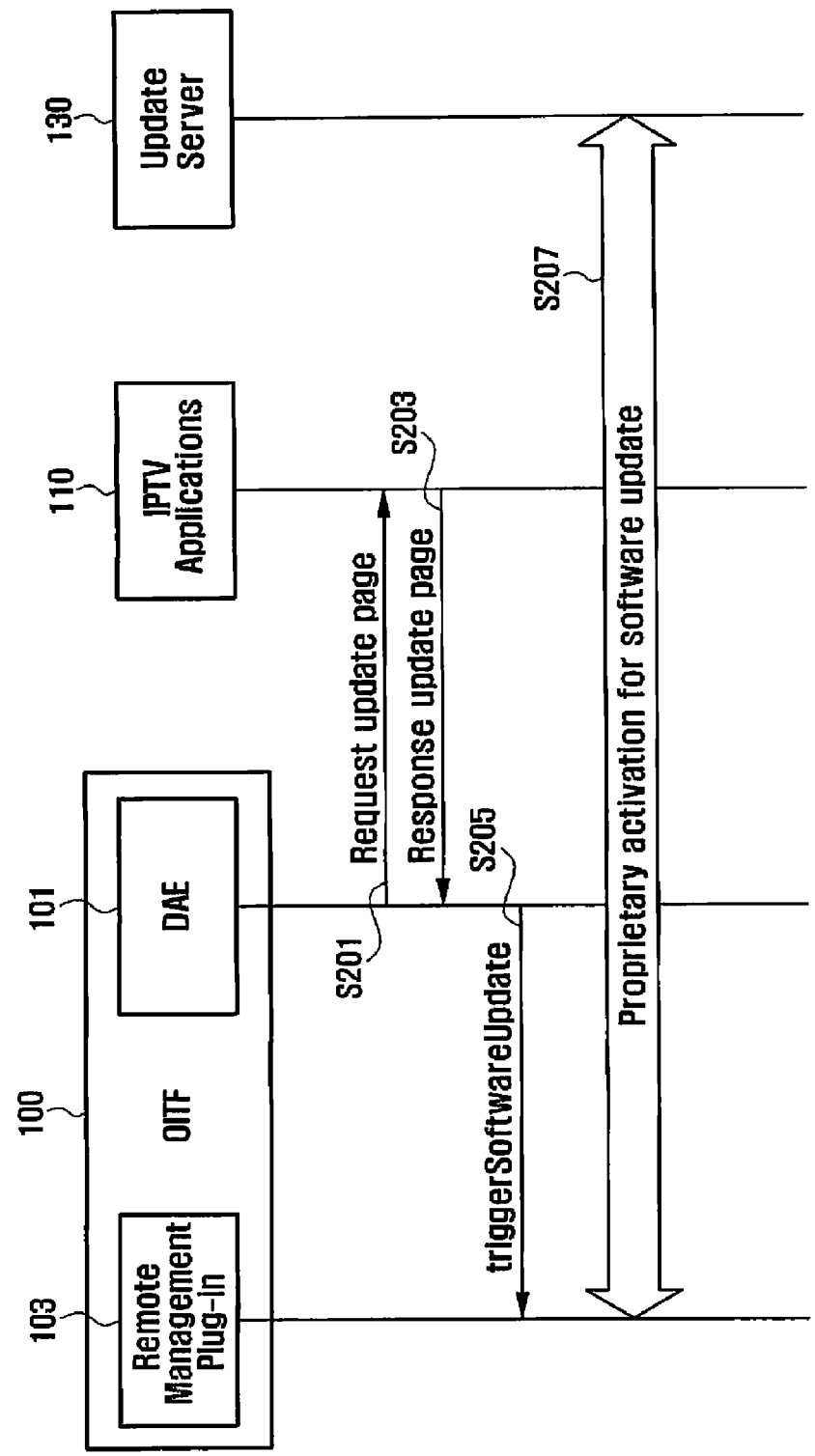
FIG. 2 is a sequence diagram illustrating operations when an OITF device 100 updates a plug-in in the conventional OIP model.

Exemplary embodiments of the present invention will be described herein below with reference to the accompanying drawings. In the drawings, the same or similar elements are denoted by the same reference numerals even though they are depicted in different drawings. In the following description, well-known functions or constructions are not described in detail since they would obscure the invention in unnecessary detail.

Figure 3:
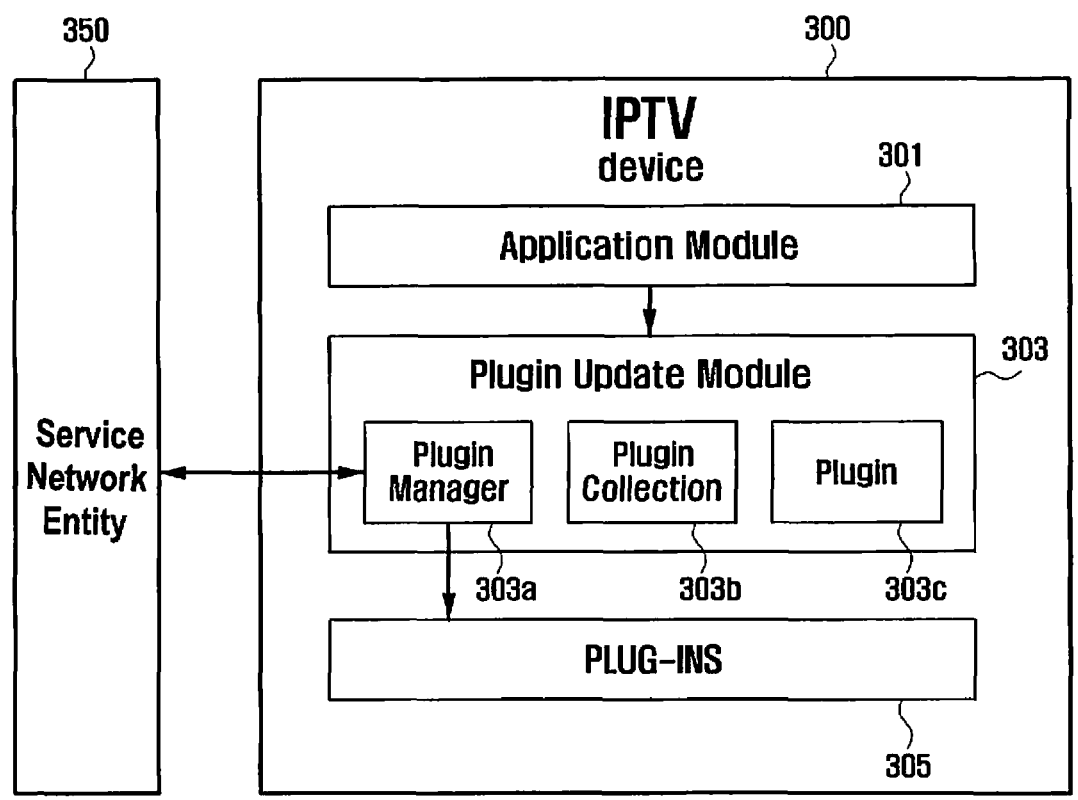
FIG. 3 is schematic diagram illustrating an IPTV system for supporting a user service profile-based plug-in update method according to an embodiment of the present invention.

FIG. 3 is a diagram illustrating an IPTV system for updating plug-ins in an Internet Protocol TeleVision (IPTV) device according to an embodiment of the present invention.

Referring to FIG. 3, a system for updating a plug-ins according to an embodiment of the present invention includes an IPTV device 300 and a service network entity 350.

The IPTV device 300 includes an application module 301, for providing a user interface through a displayed service screen and receiving user input. For example, if the IPTV device 300 is an Open IPTV Terminal Function (OITF) device, the application module may be a Declarative Application Environment (DAE) entity. The IPTV device 300 also includes plug-ins 305, which interact with the application module 301 to expand browsing capabilities of the application module 301 to enhance a user's browsing experience.

The IPTV device 300 also includes a plug-in update module 303 for managing updates to the plug-ins 305. The plug-in update module 303 includes three types of plug-in classes for collecting and managing data included in the plug-ins 305: plug-in manager class 303a, plug-in collection class 303b, and plug-in class 303c.

Each plug-in class 303c includes information on a corresponding plug-in 305, such as a unique identifier for the corresponding plug-in, version information, and status information for indicating whether the corresponding plug-in was installed before an update for the plug-in has become available, etc. Each plug-in collection class 303b may include information corresponding to a plurality of plug-in classes 303c and includes information indicating the number of plug-in classes 303c corresponding to the plug-in collection class 303b. The plug-in manager class 303a can retrieve information regarding the plug-ins 305 through the plug-in collection class 303b and the plug-in class 303c and access the service network entity 350 in order to execute various operations based on the retrieved information. The plug-in manager class 303a, the plug-in collection class 303b, and the plug-in classes 303c are further explained herein with reference to FIG. 7.

Figure 4:
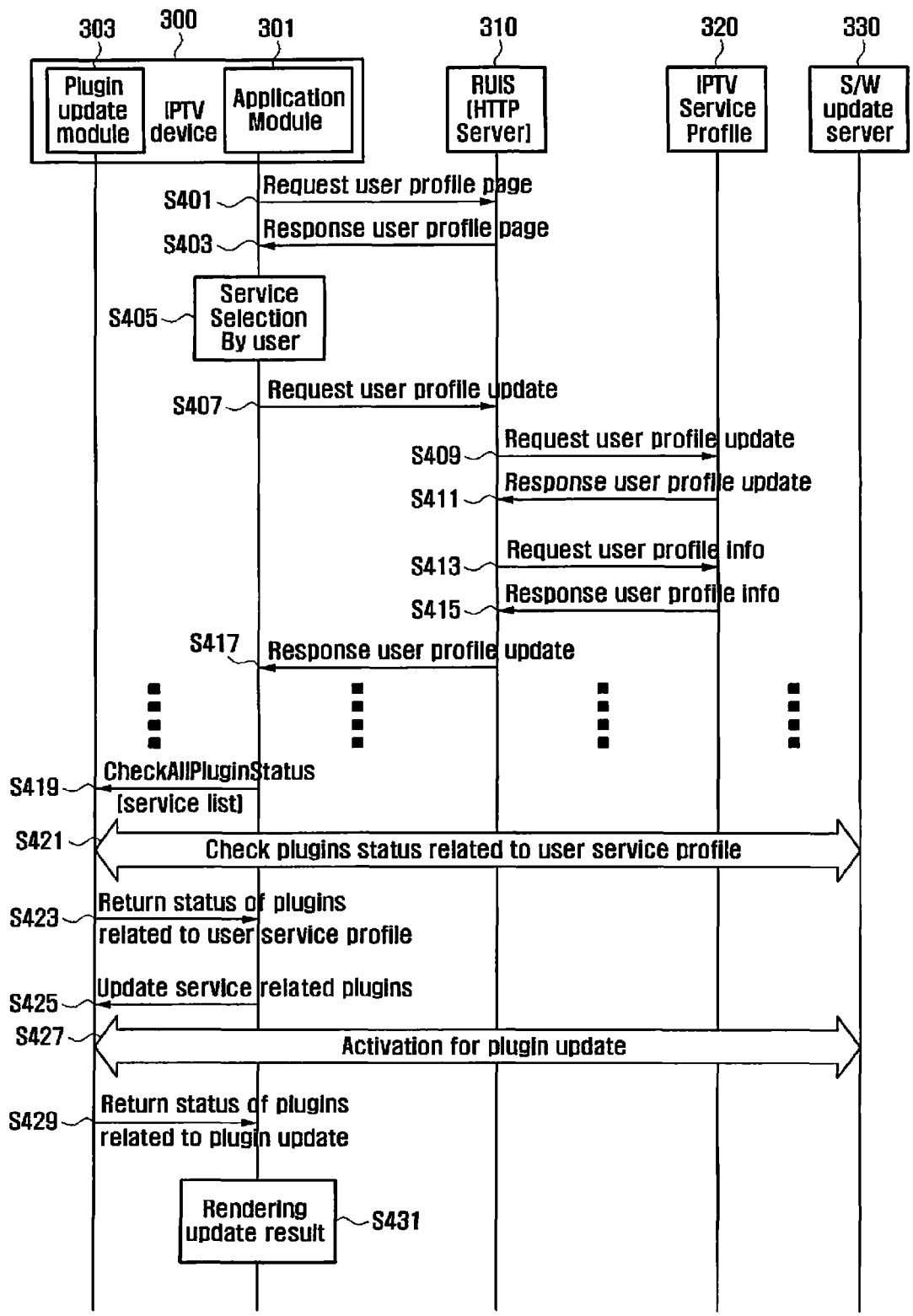
FIG. 4 is a sequence diagram illustrating operations of the IPTV system of FIG. 3 when the IPTV device initiates a user service profile-based plug-in update according to an embodiment of the present invention.
Figure 5:
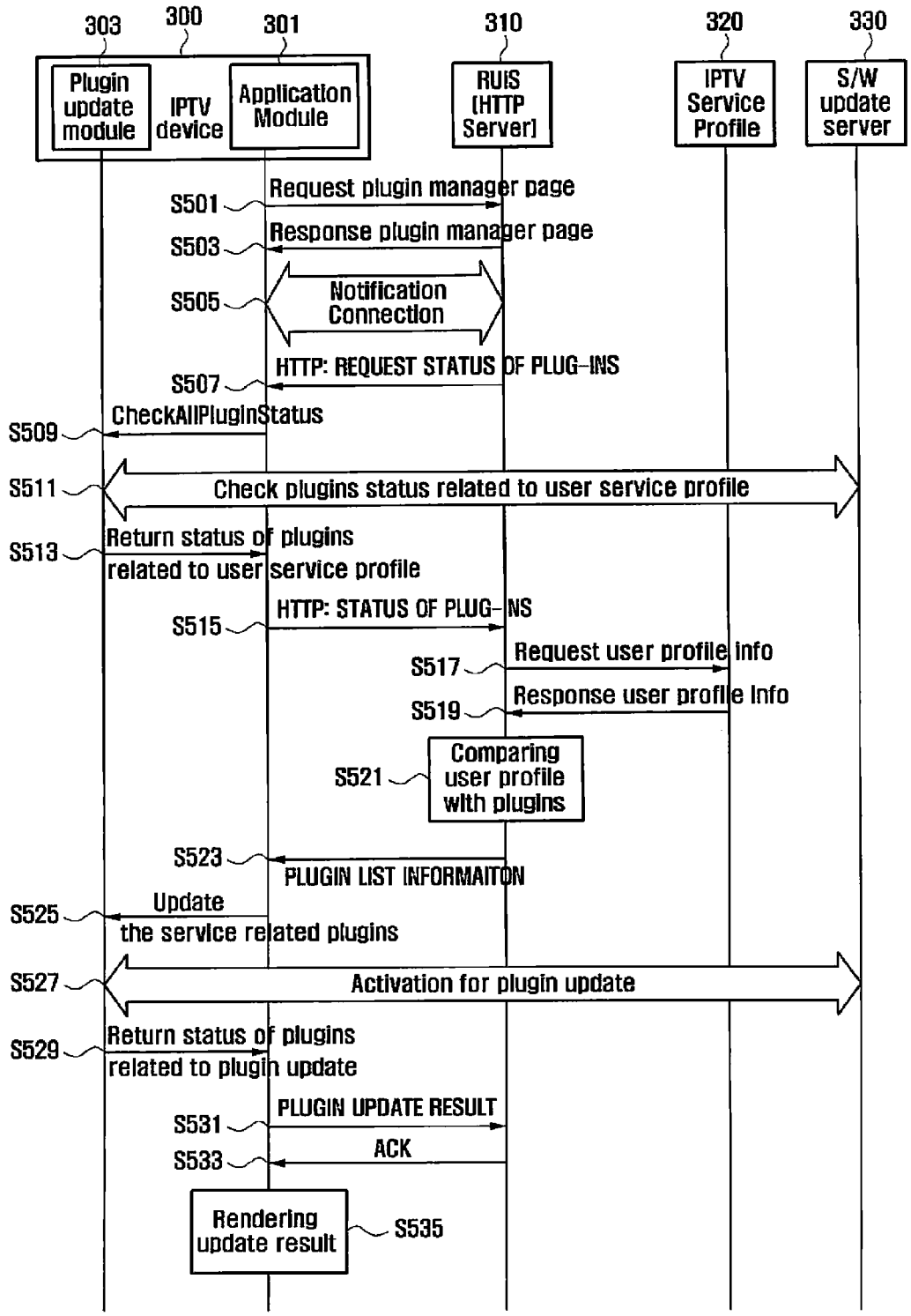
FIG. 5 is a sequence diagram illustrating operations of the IPTV system of FIG. 3 when the server initiates a user service profile-based plug-in update according to an embodiment of the present invention.
Figure 6:
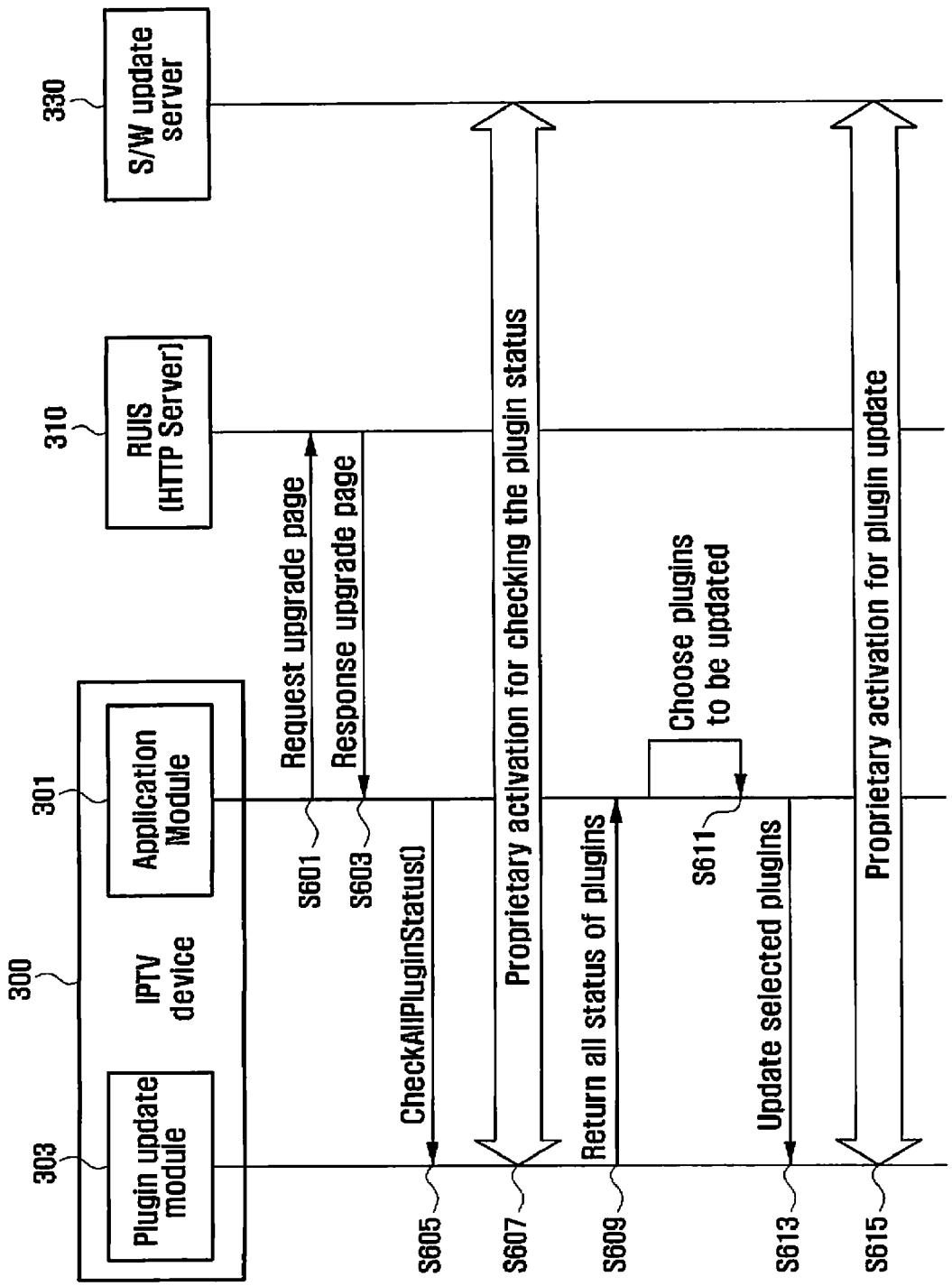
FIG. 6 is a sequence diagram illustrating operations of the IPTV system of FIG. 3 when the IPTV device updates plug-ins dynamically regardless of a user service profile according to an embodiment of the present invention.

Methods of updating plug-ins in the IPTV device 300 according to various embodiments of the present invention are described as follows with reference to FIGS. 4-6. In FIGS. 4-6, the service network entity 350 is depicted as including a Remote User Interface Server (RUIS) 310, an IPTV service profile entity 320, and a software update server 330. The arrangement of entities within the service network entity 350 is merely for illustration and by way of example, and various changes in form may be made to the arrangement of the entities within the service network entity 350 without departing from the scope of the invention. For example, the functions of the service network entity 350 may be implemented in a single server.

FIG. 4 is a sequence diagram illustrating operations of the IPTV system of FIG. 3 when the IPTV device 300 initiates a user service profile-based plug-in update according to a first embodiment of the present invention, wherein a user selects IPTV services and the IPTV device 300 updates plug-ins that support the selected services.

Referring to FIG. 4, when the IPTV device 300 receives a user request for a profile page through the application module 301, the application module 301 sends a request for a user profile page to the RUIS 310, in step S401. In an embodiment of the present invention, the RUIS 310 may be a HyperText Transfer Protocol (HTTP) server. Upon receiving the request for the user profile page, the RUIS 310 sends a user profile page response message including the user profile page to the application module 301 in step S403. Upon receiving the user profile page, the application module 301 displays the user profile page, enabling a user to add and/or remove services from a list of available services displayed in the user profile page. Upon receiving a selection of services from the user in step S405, the application module 301 sends a request for a user profile update to the RUIS 310 in step S407.

The RUIS 310 forwards the user profile update request to an IPTV service profile entity 320 in step S409. The IPTV service profile entity 320 updates the user's service profile according to the user profile update request and sends a user profile update response message indicating a result of the user profile update to the RUIS 310 in step S411. Upon receiving the user profile update response message, the RUIS 310 sends a request for current user profile information to the IPTV service profile entity 320 in step S413. The IPTV service profile entity 320 sends a user profile information response message including the current user profile information to the RUIS 310 in step S415. Upon receiving the user profile information response message, the RUIS 310 sends a user profile update response message to the application module 301 in step S417.

Upon receiving the user profile update response message, the application module 301 sends a CheckAllPluginStatus[ ] command to a plug-in update module of the plug-in update module 303, in step S419. The CheckAllPluginStatus[ ] command preferably includes a parameter for indicating services to be updated. In accordance with an embodiment of the present invention, the parameter is set to the services indicated in the user profile update response message. Upon receiving the CheckAllPluginStatus[ ] command, the plug-in update module 303 determines a first group of corresponding plug-ins that support the services indicated in the CheckAllPluginStatus[ ] command and communicates with the IPTV service profile entity 320 and the software update server 330 in order to determine status information of the corresponding plug-ins step in S421. Upon determining the status information for the corresponding plug-ins, the plug-in update module 303 sends the status information to the application module 301 in step S423. Upon receiving the status information, the application module 301 outputs information regarding the corresponding plug-ins to a user and sends a command to update the corresponding plug-ins, as a second plug-in group, to the plug-in update module 303 in step S425.

Upon receiving the command to update the second plug-in group, the plug-in update module 303 communicates with the software update server 330 to retrieve information required for updating the corresponding plug-ins, and updates the corresponding plug-ins in step S427. When the corresponding plug-ins are updated, the plug-in update module 303 sends a message indicating plug-in update results to the application module 301 in step S429. Then, the application module 301 informs a user of the update results in step S431.

FIG. 5 is a sequence diagram illustrating operations of the IPTV system of FIG. 3 when the IPTV device 300 initiates a user service profile-based plug-in update according to another embodiment of the present invention. The method according to this embodiment of the invention is similar to the method according to the previous embodiment of the invention, except that instead of adding/removing services from a service profile and updating plug-ins corresponding to an updated service profile, the RUIS 310 initiates an update of plug-ins corresponding to a current user service profile.

Referring to FIG. 5, when the IPTV device 300 receives a request for a plug-in manager page, the application module 301 sends the request for the plug-in manager page to the RUIS 310, in step S501. Upon receiving the request for the plug-in manager page, the RUIS 310 sends to the application module 301 a plug-in manager response message including the plug-in manager page in step S503, but the plug-in manager page is not presented to the user. A notification connection is established between the application module 301 and the RUIS 310 in step S505.

While the notification connection is established, the RUIS 310 sends an HTTP request for plug-in status information to the application module 301 in step S507.

Upon receiving the HTTP request for plug-in status information, the application module 301 sends a CheckAllPluginStatus[ ] command to a plug-in update module of the plug-in update module 303, in step S509. Upon receiving the CheckAllPluginStatus[ ] command, the plug-in update module 303 determines a first group of corresponding plug-ins that support services available to the IPTV device 300 and communicates with the IPTV service profile entity 320 and the software update server 330 in order to determine status information of the corresponding plug-ins in step S511. Upon determining the status information for the corresponding plug-ins, the plug-in update module 303 sends the status information to the application module 301 in step S513.

Upon receiving the status information, the application module 301 forwards the status information to the RUIS 310 in, for example, an HTTP message in step S515. Then, the RUIS 310 sends a request for profile information to the IPTV service profile entity 320 in step S517. The IPTV service profile entity 320 sends a user profile information response message containing the user profile information corresponding to the IPTV device 300 in step S519. Upon receiving the user profile information, the RUIS 310 compares the user profile information with the status information of the plug-ins to determine a list of updateable plug-ins corresponding to the user profile in step S521. The RUIS 310 then sends a message including the plug-in list information, as a second group of corresponding plug-ins, to the application module 301 in step S523.

Upon receiving the second plug-in group, the application module 301 sends a command to update the second group of corresponding plug-ins to the plug-in list to the plug-in update module 303 in step S525.

Upon receiving the command to update the corresponding plug-ins, the plug-in update module 303 communicates with the software update server 330 to retrieve information required for updating the corresponding plug-ins, and updates the corresponding plug-ins in step S527. When the corresponding plug-ins are updated, the plug-in update module 303 sends a message indicating results of the plug-in updates to the application module 301 in step S529.

The application module 301 forwards the plug-in update results to the RUIS 310 in step S531 and receives an acknowledgement message from the RUIS 310 in response to the forwarded plug-in update results in step S533. Then, the application module 301 informs a user of the update results in step S535.

FIG. 6 is a sequence diagram illustrating operations of the IPTV system of FIG. 3 when the IPTV device 300 initiates a user service profile-based plug-in update according to another embodiment of the present invention. The method according to this embodiment of the invention is similar to that described above in reference to FIG. 4, except that instead of adding/removing services from a service profile and updating plug-ins corresponding to an updated service profile, a user directly selects plug-ins to update from among updateable plug-ins corresponding to a current user profile.

Referring to FIG. 6, when the IPTV device 300 receives a user request for an update page through the application module 301, the application module 301 sends an update page request to the RUIS 310, in step S601. Upon receiving the request for the updated page, the RUIS sends an update page response message to the application module 301 in step S603.

Upon receiving the update page response message, the application module 301 sends a CheckAllPluginStatus[ ] command to a plug-in update module 303, in step S605. In accordance with an embodiment of the present invention, the CheckAllPluginStatus[ ] parameter is empty, which indicates that status information for plug-ins corresponding to all available services is requested.

Upon receiving the CheckAllPluginStatus[ ] command, the plug-in update module 303 determines a first group of plug-ins corresponding to the available services and communicates with the software update server 330 in order to determine status information of the corresponding plug-ins in step S607. Upon determining the status information for the corresponding plug-ins, the plug-in update module 303 sends the status information to the application module 301 in step S609.

Upon receiving the status information, the application module 301 outputs a user profile page to a user interface for indicating plug-ins for which updates are available and enabling a user to select plug-ins to be updated. Upon receiving a user selection of plug-ins to be updated in step S611, the application module 301 sends a command to update the selected plug-ins, as a second group of corresponding plug-ins, to the plug-in update module 303 in step S613.

Upon receiving the command to update the second group of corresponding plug-ins, the plug-in update module 303 communicates with the software update server 330 to retrieve information required for updating the selected plug-ins, and updates the second group of plug-ins in step S615.

Figure 7:
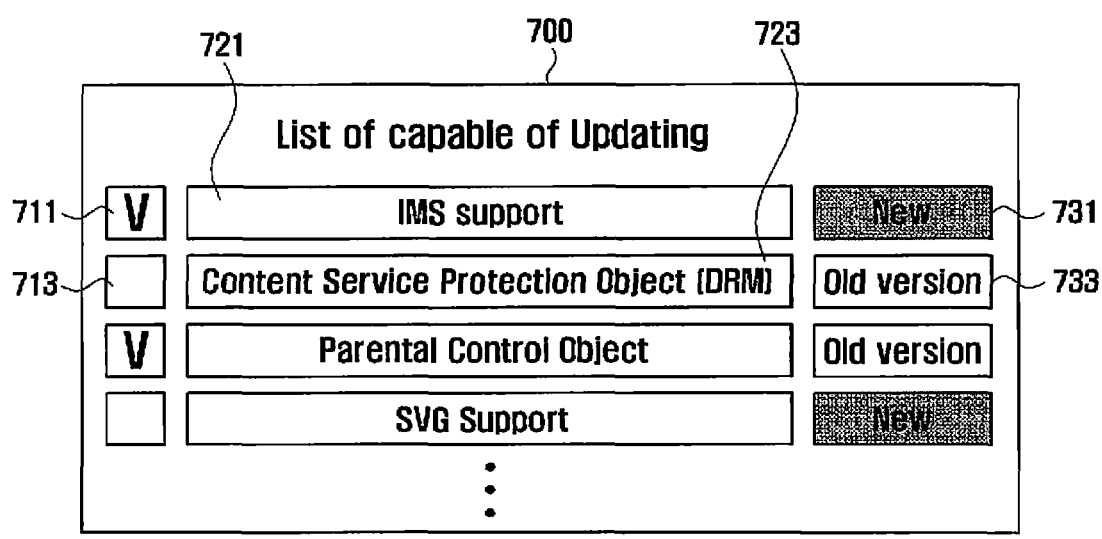
FIG. 7 is a user interface for indicating and selecting plug-ins to be updated according to an embodiment of the present invention.

FIG. 7 is a user interface for indicating and selecting plug-ins to be updated according to an embodiment of the present invention. The center column of FIG. 7 includes a list of services, including Internet protocol Media Subsystem (IMS) support 721 and Content Service Protection Object 723, which may each correspond to at least one plug-in. The checkboxes to the right of each respective listed service allows a user to select services for which corresponding updates will be downloaded. For example, checkboxes 711 and 713 correspond to IMS support 721 and Content Service Protection Object 723, respectively. The "New" and "Old version" indicators, such as new indicator 731 and old version indicator 733, to the right of each respective service inform a user whether new available plug-ins corresponding to the service are available. FIG. 7 may be a user profile page according to the first embodiment of the invention described with reference to FIG. 4. However, the user interface of FIG. 7 is provided only as an example, and alternative user interfaces may be provided according to any of the embodiments of the present invention without deviating from the scope of the present invention.

FIG. 8 is a diagram illustrating a format of data structures and corresponding methods for plug-ins in accordance with an embodiment of the present invention.

Referring to FIG. 8, the format according to an embodiment of the present invention is compatible with the DAE Working Group (WG) specification of the Open IPTV Forum (OIPF). However, other formats may be used without departing from the scope of the present invention. The format the FIG. 8 includes the plug-in, which is defined as "Application/oipfPluginManager," which manages status information of all plug-ins. The plug-in includes the three APIs (plug-in manager class 303a, plug-in collection class 303b, and plug-in class 303c) described above with reference to FIG. 3. Each plug-in according to the plug-in class 303c includes one of the unique mimeType names listed in Table 1, and further includes version information for indicating whether the plug-in is older than a latest available version of the plug-in or indicating whether the plug-in is not installed.

TABLE 1

| Mime type List |
| --- |
| application/oipfObjectFactory |
| application/oipfapplicationManager |
| application/oipfConfiguration |
| application/oipfDownloadTrigger |
| application/oipfDownloadManager |
| application/oipfCodManager |
| application/oipfDrmAgent |
| application/oipfGatewayInfo |
| application/oipfIms |
| application/notifsocket |
| application/oipfParentalControlManager |
| application/oipfRecordingScheduler |

TABLE 1-continued

| Mime type List |
| --- |
| application/oipfRemoteManagement |
| application/oipfSearchManager |
| video/broadcast |
| video/local |
| video/mpeg |
| application/oipfStatusView |

The plug-in collection class 303b may include a plurality of plug-in classes 303c, and can access any of the contained plug-ins via a plug-in item( ) method, which has an integer parameter for indicating an integer corresponding to a plug-in. The plug-in collection class 303b also includes a "length" property for indicating the number of plug-in classes 303c corresponding to the plug-in collection class 303b.

The plug-in manager class 303a includes various methods for managing the plug-in collection class 303b and the plug-in class 303c. The checkAllPluginStatus (String userService-ProfileInfo) method is for checking status information of all plug-ins that support services indicated by a service profile entered into the userServiceProfileInfo parameter. If the userServiceProfileInfo parameter has no value, then the method checks for status information of all plug-ins corresponding to the IPTV device 300. Upon checking the status information, the plug-in manager class 303a updates the status information and returns the plug-in collection class 303b including status information to the application module 301. The checkPluginStatus (String mimeType) method is for checking the status of individual plug-ins identified by their unique mimeType, and returns a plug-in class including the status information corresponding to the input mimeType. The updatePlugin (Plugin plugin) method is for updating or installing a specified plug-in. If the update or installation is successful, the updatePlugin method returns the value "true," and if the update or installation is not successful, returns the value "false."

As described above, the user service profile-based plug-in update system and method for an IPTV service according to the embodiment of the present invention enable an IPTV device to selectively update plug-ins required for the user service profile corresponding to the IPTV device.

While the present invention has been shown and described with reference to various embodiments thereof, it will be understood by those skilled in the art that various changes in form and details may be made therein without departing from the spirit and scope of the present invention as defined by the appended claims.

What is claimed is:

1. A method of updating a plug-in in an Internet Protocol Television (IPTV) device including a plug-in update module and an application module, the method comprising:

determining a second plug-in group selected from among a first plug-in group to be updated according to status information of each plug-in indicated in the first plug-in group in the IPTV device; and updating each plug-in indicated in the second plug-in group, wherein the status information of each plug-in includes information indicating whether an update exists for each plug-in, and wherein determining the second plug-in group comprises:

generating, by the application module, a check plug-in status message including a service parameter for indicating services corresponding to a service profile;

sending, to the plug-in module, the check plug-in status message;

generating, by the plug-in update module, the first plug-in group according to the check plug-in status message;

checking, by the plug-in update module, the status information of each plug-in indicated in the first plug-in group;

sending the status information of each plug-in from the plug-in update module to the application module; and generating, by the application module, an update plug-in message indicating the second plug-in group based on the status information of each plug-in.

2. The method of claim 1, wherein updating each plug-in indicated in the second plug-in group comprises:

sending, to the plug-in module, the update plug-in message; and updating, by the plug-in update module, each plug-in indicated in the second plug-in group.

3. The method of claim 1, wherein generating the first plug-in group comprises:

if the service parameter indicates a service, generating the first plug-in group including a plug-in that supports the indicated service; and if the service parameter does not indicate a service, generating the first plug-in group including all plug-ins available to the IPTV device.

4. The method of claim 1, wherein checking the status information of each plug-in comprises:

sending, from the plug-in update module, to at least one service network entity, a request for the status information of each plug-in; and receiving, by the plug-in update module, from the at least one service network entity, the status information of each plug-in.

5. The method of claim 1, wherein generating the check plug-in status message comprises:

receiving, by the application module, a user-selected set of services;

sending, to a service network entity, a profile update request message indicating the user-selected set of services;

receiving, by the application module, from the service network entity, a profile update response message indicating a result of an update of the service profile; and setting the service parameter to the user-selected set of services.

6. The method of claim 1, wherein generating the update plug-in message comprises:

receiving, by the application module, a user-selected set of plug-ins, which are selected by a user from among the plug-ins indicated in the first plug-in group; and setting the second plug-in group to the user-selected set of plug-ins.

7. The method of claim 1, wherein generating the update plug-in message comprises:

sending, from the application module, to a Remote User Interface Server (RUIS), the status information of each plug-in;

generating, by the RUIS, a plug-in list based on the status information of each plug-in;

receiving, by the application module, from the RUIS, the plug-in list;

generating, by the application module, the second plug-in group using the plug-in list.

8. The method of claim 7, wherein generating the plug-in list comprises:

sending, from the RUIS, to an Internet Protocol TeleVision (IPTV) service profile entity, a request for user profile information indicating a set of services corresponding to the IPTV device;

receiving, by the RUIS, from the IPTV service profile entity, the user profile information;

comparing, by the RUIS, the user profile information with the status information of each plug-in; and determining the plug-in list according to a result of the comparison.

9. The method of claim 1, further comprising:

establishing, by the application module, a notification connection with a Remote User Interface Server (RUIS); and receiving, by the application module, from the RUIS, a plug-in status request message, wherein generating the check plug-in status message is performed by the application module, in response to the plug-in status request message.

10. The method of claim 1, wherein updating each plug-in included in the second plug-in group comprises:

receiving, by the plug-in update module, plug-in update information corresponding to the second plug-in group of plug-ins; and updating each plug-in included in the second plug-in set based on the plug-in update information.

11. A device for updating a plug-in in an Internet Protocol TeleVision (IPTV) system, the device comprising:

an application module for determining a second plug-in group selected from among a first plug-in group to be updated according to status information of each plug-in indicated in the first plug-in group in the device; and a plug-in update module for updating the each plug-in indicated in the second plug-in group, wherein the status information of each plug-in includes information indicating whether an update exists for each plug-in, and wherein the application module generates a check plug-in status message including a service parameter for indicating services corresponding to a service profile, sends the check plug-in status message to a plug-in update module, generates an update plug-in message indicating the second plug-in group based on the status information received from the plug-in update module, and sends the update plug-in message to the plug-in update module.

12. The device according to claim 11, wherein the plug-in update module generates the first plug-in group according to the check plug-in status message, checks the status information of each plug-in indicated in the first plug-in group, sends the status information of each plug-in indicated in the first plug-in group to the application module, and updates each plug-in indicated in the second plug-in group after receiving the update plug-in message from the application module.

13. The device claim 11, wherein, if the service parameter indicates a service, the first plug-in group includes a plug-in that supports the indicated service, and wherein if the service parameter does not indicate a service, the first plug-in group includes all plug-ins available to the device.

14. The device of claim 11, wherein the plug-in update module sends, to at least one service network entity, a request for the status information of each plug-in, and receives the status information of each plug-in from the at least one service network entity.

15. The device of claim 11, wherein the application module sends, to an external device, a profile update request message indicating a user-selected set of services to be used for updating a user profile, and receives, from the external device, a profile update response message indicating a result of an update of the service profile,
  wherein the application module receives the user-selected set of services through a user interface the device, and
  wherein the application module sets the service parameter to the user-selected set of services, upon receiving the profile update response message from the IPTV service profile entity.

16. The device of claim 11, wherein the application module generates the update plug-in message by receiving a user-selected set of plug-ins from among the plug-ins indicated in the first plug-in group, and setting the second plug-in group to the user-selected set of plug-ins.

17. The device of claim 11, wherein the application module sends, to a Remote User Interface Service (RUIS), the status information of each plug-in from the interface to be used for generating a plug-in list based on the status information of each plug-in,
  wherein the application module receives the plug-in list from the RUIS, and
  wherein the application module generates the second plug-in group according to the plug-in list.

18. The device of claim 17, wherein the plug-in list is generated by an external device according to a result of a comparison between a set of services corresponding to the device and the status information of each plug-in.

19. The device of claim 11, wherein the application module receives, from a Remote User Interface Service (RUIS), a plug-in status request message, and
  wherein the application module entity generates the check plug-in status message in response to the plug-in status request message.

20. The device of claim 11, wherein the plug-in update module receives, from a software update server, plug-in update information corresponding to the second plug-in group, and
  wherein the plug-in update module updates the each plug-in included in the second plug-in group according to the plug-in update information received from the software update server.

21. The device of claim 11, wherein plug-ins are stored in a data format including:
  a plug-in class including status information of each plug-in and a unique name corresponding to a plug-in;
  a plug-in collection class including at least one plug-in class, a function for returning a first identified plug-in class, and a function for returning a number of plug-in classes included in the plug-in collection class; and
  a plug-in manager class including a checkallpluginstatus function for returning status information corresponding to a second identified plug-in class and an updateplugin function for installing or updating a third identified plug-in class.

22. The device of claim 11, wherein the device comprises an Open IPTV Terminal Function (OITF) device.

23. The device of claim 22, wherein the application module comprises a Declarative Application Environment (DAE) entity.

24. A system for updating a plug-in in an Internet Protocol TeleVision (IPTV) device, the system comprising:
  an application module for determining a second plug-in group selected from among a first plug-in group to be updated according to status information of each plug-in indicated in the first plug-in group in the device; and
  a plug-in update module for updating the each plug-in indicated in the second plug-in group,
  wherein the status information of each plug-in includes information indicating whether an update exists for each plug-in, and
  wherein the application module generates a check plug-in status message including a service parameter for indicating services corresponding to a service profile, sends the check plug-in status message to a plug-in update module, generates an update plug-in message indicating the second plug-in group based on the status information received from the plug-in update module, and sends the update plug-in message to the plug-in update module.

* * * * *